United States Patent
Babu et al.

(10) Patent No.: US 10,628,496 B2
(45) Date of Patent: Apr. 21, 2020

(54) VALIDATING AND CORRELATING CONTENT

(71) Applicant: DELL PRODUCTS, LP, Round Rock, TX (US)

(72) Inventors: Rathi Babu, Bangalore (IN); Mainak Roy, Kolkatas (IN); Upendran Boovaraha, Bangalore (IN); Chitrak Gupta, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 297 days.

(21) Appl. No.: 15/470,300

(22) Filed: Mar. 27, 2017

(65) Prior Publication Data
US 2018/0276208 A1   Sep. 27, 2018

(51) Int. Cl.
*G06F 7/00* (2006.01)
*G06F 16/93* (2019.01)
*G06F 16/951* (2019.01)
*G06F 16/31* (2019.01)

(52) U.S. Cl.
CPC ............ *G06F 16/93* (2019.01); *G06F 16/313* (2019.01); *G06F 16/951* (2019.01)

(58) Field of Classification Search
CPC ...... G06F 16/93; G06F 16/313; G06F 16/951; G06F 19/24; G06F 17/153; G06F 19/707
USPC ................................ 707/709, 708, 749, 728
See application file for complete search history.

(56) References Cited

U.S. PATENT DOCUMENTS

| | | | | |
|---|---|---|---|---|
| 5,625,767 A | * | 4/1997 | Bartell | G06F 16/26 345/440 |
| 5,675,819 A | * | 10/1997 | Schuetze | G06F 17/274 704/10 |
| 5,745,602 A | | 4/1998 | Chen et al. | |
| 6,181,976 B1 | * | 1/2001 | Chandler | G06F 17/10 700/42 |
| 7,895,205 B2 | | 2/2011 | Qin et al. | |
| 8,185,482 B2 | * | 5/2012 | Yang | G06N 5/02 706/12 |
| 9,047,283 B1 | * | 6/2015 | Zhang | G06F 17/2705 |
| 10,020,007 B2 | * | 7/2018 | Mizumoto | G10L 25/51 |
| 10,176,256 B1 | * | 1/2019 | Fatourechi | G06F 17/3082 |
| 10,223,438 B1 | * | 3/2019 | Xu | H04N 21/26258 |
| 2003/0182310 A1 | * | 9/2003 | Charnock | G06Q 10/10 |
| 2005/0015366 A1 | * | 1/2005 | Carrasco | G06F 16/35 |
| 2005/0198026 A1 | * | 9/2005 | Dehlinger | G06F 17/277 |
| 2005/0262073 A1 | * | 11/2005 | Reed | G11B 27/105 |

(Continued)

OTHER PUBLICATIONS

SEO & SEM Industry Dictionary, Search Engine Marketing Glossary, PageRank, 1 page, Mar. 27, 2017.

*Primary Examiner* — Mohammed R Uddin
(74) *Attorney, Agent, or Firm* — Larson Newman, LLP

(57) ABSTRACT

Online search retrieval is improved by automatic generation of key phrases. When a search engine crawls an electronic document, key words and phrases greatly help organize the electronic document to one or more topics. A quotient matrix defines a ratio of a key phrase to a total number of words in the electronic document. A correlation coefficient may also determine which key phrase correlates to the electronic document. A title key phrase may then be generated in response to the correlation coefficient having a positive value. When the search engine crawls the electronic document, the title key phrase may be provided as metadata.

20 Claims, 10 Drawing Sheets

(56) References Cited

U.S. PATENT DOCUMENTS

| | | | |
|---|---|---|---|
| 2006/0074290 A1* | 4/2006 | Chen | G06T 7/0012 600/407 |
| 2006/0155662 A1* | 7/2006 | Murakami | G06F 16/35 706/20 |
| 2006/0248068 A1* | 11/2006 | Chien | G06F 16/951 |
| 2007/0276688 A1* | 11/2007 | Sun | G06Q 10/063114 705/7.15 |
| 2008/0270116 A1* | 10/2008 | Godbole | G06F 17/279 704/9 |
| 2009/0116413 A1* | 5/2009 | George | G06N 3/0454 370/256 |
| 2011/0213655 A1* | 9/2011 | Henkin | G06Q 30/00 705/14.49 |
| 2012/0215491 A1* | 8/2012 | Theriot | G07C 5/0808 702/183 |
| 2013/0018900 A1* | 1/2013 | Cheng | G06F 7/00 707/755 |
| 2013/0170813 A1* | 7/2013 | Woods | H04N 5/765 386/200 |
| 2014/0115635 A1* | 4/2014 | Mashimo | H04N 21/4668 725/53 |
| 2016/0110428 A1* | 4/2016 | Vasenkov | G06F 16/367 707/776 |
| 2016/0307571 A1* | 10/2016 | Mizumoto | G10L 25/51 |
| 2016/0350672 A1* | 12/2016 | Snyder | H04L 51/32 |
| 2017/0017897 A1* | 1/2017 | Bugay | G06F 16/338 |
| 2018/0121537 A1* | 5/2018 | Sack | G06F 16/38 |
| 2018/0268065 A1* | 9/2018 | Parepally | G06F 16/334 |

\* cited by examiner

VALIDATING AND CORRELATING CONTENT

FIELD OF THE DISCLOSURE

The present disclosure generally relates to information handling systems, and relates more particularly to validating and correlating content.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

Online search retrieval is improved by automatic correlation of key phrases. When a search engine crawls an electronic document, key words and phrases greatly help organize the electronic document to one or more topics. A quotient matrix defines a ratio of a key phrase to a total number of words in the electronic document. A correlation coefficient may also determine which key phrase correlates to the electronic document. A title key phrase may then be generated in response to the correlation coefficient having a positive value. When the search engine crawls the electronic document, the title key phrase may be provided as metadata.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
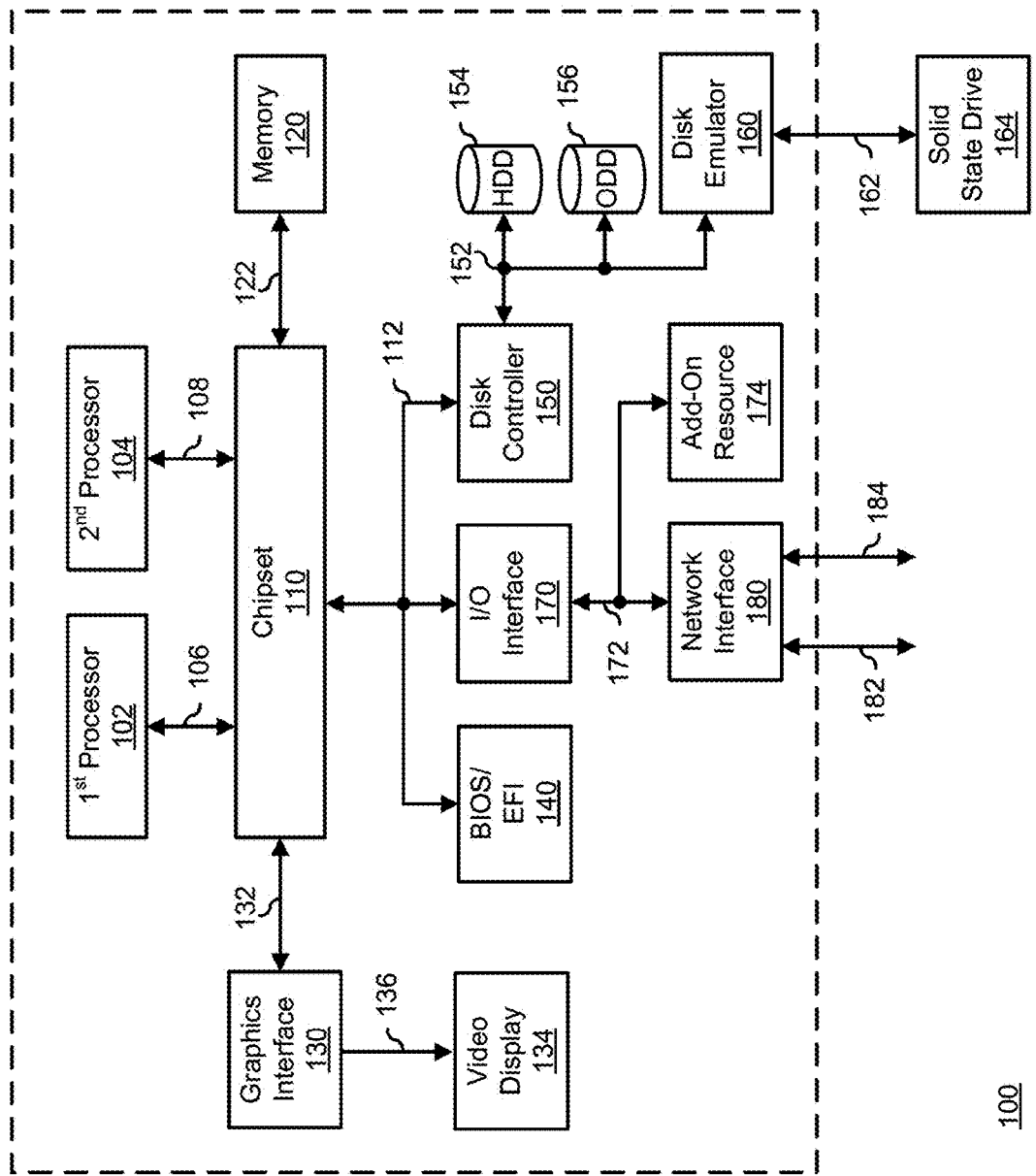
FIG. 1 is a block diagram illustrating an information handling system according to an embodiment of the present disclosure.
Figure 2:
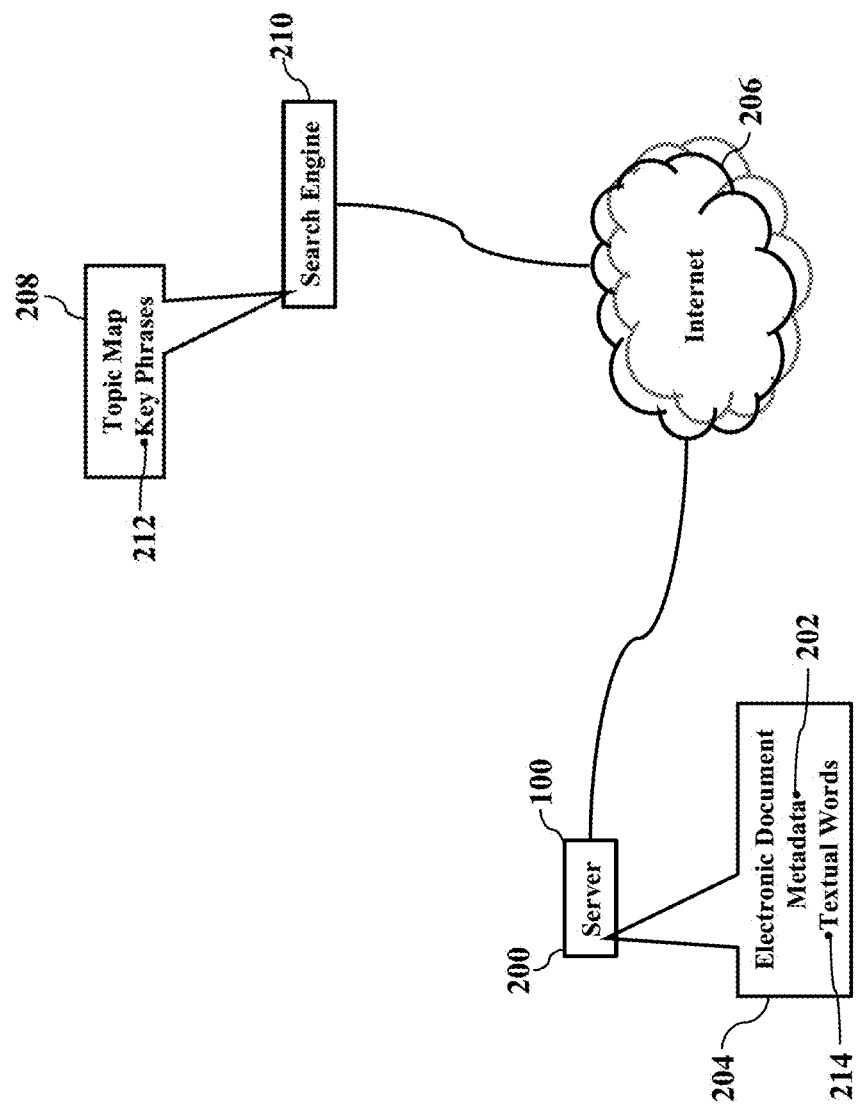
FIGS. 2-5 are simplified illustrations of search engine optimization, according to exemplary embodiments.

FIG. 1 illustrates a generalized embodiment of an information handling system 100, according to exemplary embodiments. For purpose of this disclosure the information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, the information handling system 100 can be a personal computer, a laptop computer, a smart phone, a tablet device or other consumer electronic device, a network server, a network storage device, a switch router or other network communication device, or any other suitable device and may vary in size, shape, performance, functionality, and price. Further, the information handling system 100 can include processing resources for executing machine-executable code, such as a central processing unit (CPU), a programmable logic array (PLA), an embedded device such as a System-on-a-Chip (SoC), or other control logic hardware. The information handling system 100 can also include one or more computer-readable medium for storing machine-executable code, such as software or data. Additional components of the information handling system 100 can include one or more storage devices that can store machine-executable code, one or more communications ports for communicating with external devices, and various input and output (I/O) devices, such as a keyboard, a mouse, and a video display. The information handling system 100 can also include one or more buses operable to transmit information between the various hardware components.

The information handling system 100 can include devices or modules that embody one or more of the devices or modules described above, and operates to perform one or more of the methods described above. The information handling system 100 includes one or more processors (such as reference numerals 102 and 104), a chipset 110, a memory 120, a graphics interface 130, a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106, and processor 104 is connected to chipset 110 via processor interface 108. Memory 120 is connected to chipset 110 via a memory bus 122. Graphics interface 130 is connected to chipset 110 via a graphics interface 132, and provides a video display output 136 to a video display 134. In a particular embodiment, the information handling system 100 includes separate memories that are dedicated to each of the processors 102 and 104 via separate memory interfaces. An example of the memory 120 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high-speed PCI-Express (PCIe) interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources.

Disk controller 150 includes a disk interface 152 that connects the disk controller 150 to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1194 (Firewire) interface, a proprietary interface, or a combination thereof. Alternatively, solid-state drive 164 can be disposed within information handling system 100.

I/O interface 170 includes a peripheral interface 172 that connects the I/O interface to an add-on resource 174 and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within the information handling system 100, on a main circuit board of the information handling system 100, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

FIGS. 2-5 are simplified illustrations of search engine optimization, according to exemplary embodiments. Here the information handling system 100 may be configured as a server 200 that optimizes metadata 202 describing an electronic document 204. As the reader likely understands, when the electronic document 204 is published via the Internet 206, the metadata 202 associates the electronic document 204 to a hierarchical topic map 208. That is, the metadata 202 helps a search engine 210 locate and organize the electronic document 204 according to one or more key phrases 212. The search engine 210 crawls electronic content (such as the metadata 202) representing the electronic document 204. The metadata 202 may thus determine a position within the hierarchical topic map 208.

Conventional search engines can be ineffective. If the electronic document 204 poorly correlates to the hierarchical topic map 208, then the electronic document 204 may be lost as irrelevant regardless of its actual wording or content. Indeed, as there are many different search engines using different search strategies and algorithms, a content owner/publisher needs to ensure the electronic document 204 is hierarchically organized regardless of the search engine vendor or operator. The metadata 202 thus needs to be agnostic to the search engine 210 and needs to best position the electronic document 204.

Exemplary embodiments thus optimize the metadata 202 to ensure optimum placement. The key phrases 212 are determined based on textual words 214 contained within the electronic document 204. The key phrases 212 may even be validated with other documents having a similar topological organization.

Figure 3:
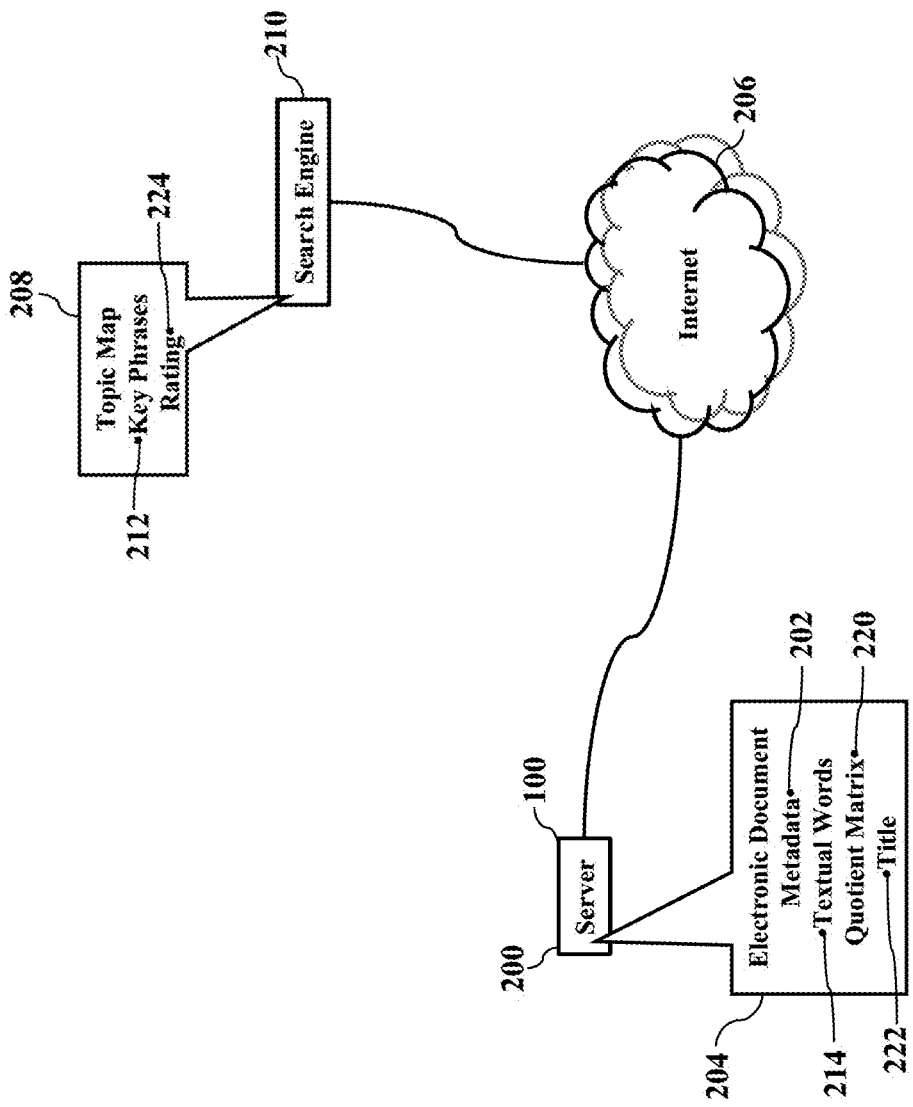

FIG. 3 illustrates a quotient matrix 220. Here the server 200 generates the quotient matrix 220 based on one or more titles 222 associated with the electronic document 204. That is, the quotient matrix 220 is defined as $$\text{quotient matrix} = \frac{\text{word(s) in title}}{\text{total number of words}},$$

where the quotient matrix 220 is a ratio of the number of words in the title 222 to a total word count of the textual words 214 in the electronic document 204. The title 222 may be an overall title associated with the electronic document 204 and/or a chapter or sub-chapter title or heading. Regardless, the quotient matrix 220 may be determined for each individual word 214 in the title 222 and/or for a combinational phrase of the words 214. Exemplary embodiments may remove generic words from the title 222 to reduce perhaps meaningless calculations. For example, articles (such as "an," "the," "a," and "be") have little informational content and may be deleted from the title 222. The quotient matrix 220 may thus be a series or matrix value for each word or phrase in the title 222. Many search engine optimizers assign a rating 224 based on the title 222 (e.g., the number of key phrases introduced within the first seventy-three (73) characters of the title 222 defines the search engine optimization (or "SEO") rating 224). The higher the topical title key phrase matches with the electronic document 204, then the greater SEO rating 224. A greater ratio value of the quotient matrix 220 may thus be a more favorable indicator of the SEO rating 224.

Figure 4:
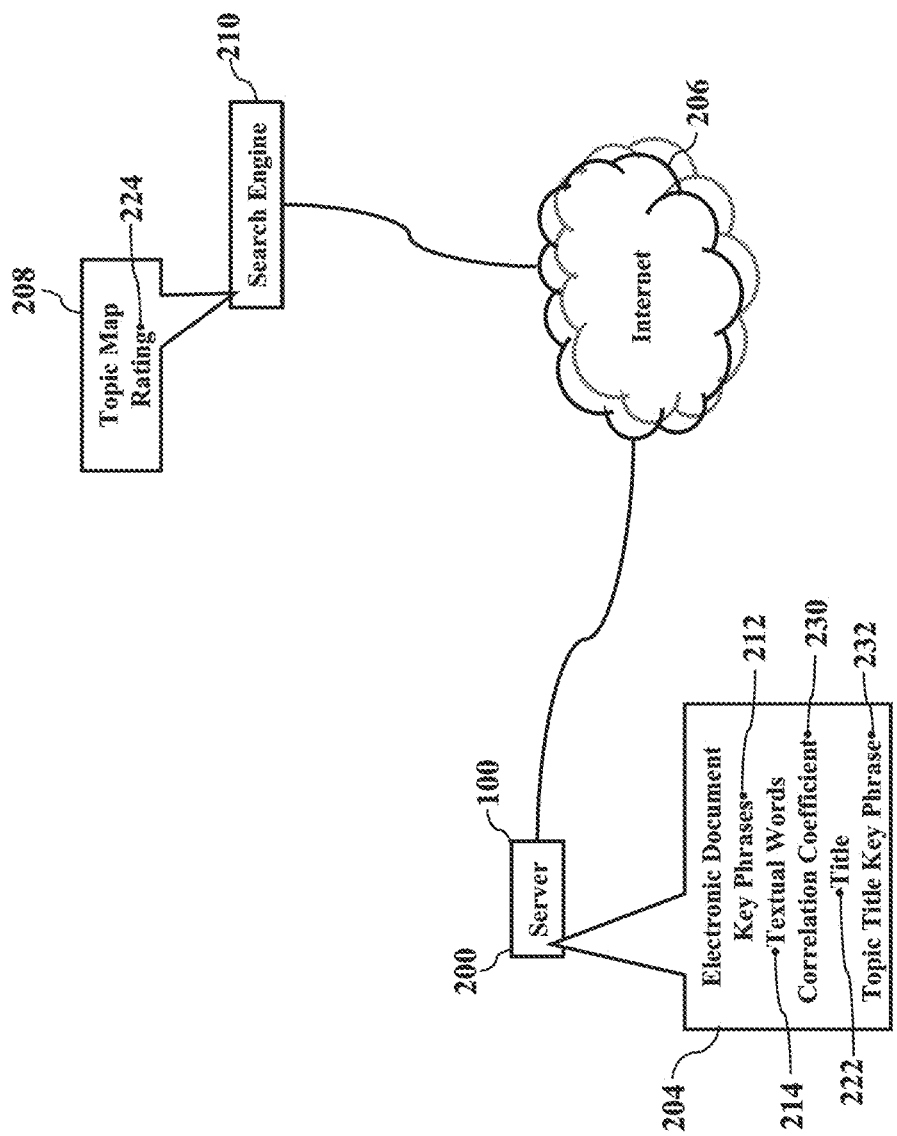

FIG. 4 illustrates a correlation coefficient 230. The correlation coefficient 230 measures a correlation between the key phrases 212 contained within the electronic document 204 and other documents having a same or similar position within the hierarchical topic map 208. That is, the correlation coefficient 230 determines the appropriateness of the key phrases 212 from a product perspective. For example, when a manufacturer wishes to organize product manuals and literature, exemplary embodiments may validate individual titles with other topical titles organized according to product documentation associated with a product. The correlation coefficient 230 may thus be a series or matrix value for each word or phrase in the title 222. Some generic textual words 214 may be removed from the title 222 to reduce perhaps meaningless calculations. Some key phrases 212 will thus strongly correlate with the other documents having a same or similar position within the hierarchical topic map 208, so these key phrases 212 will have a greater correlation coefficient 230. Less popular key phrases 212 may have a smaller correlation coefficient 230.

Exemplary embodiments may only consider positive values. Sufficient correlation yields positive values. Exemplary embodiments may thus only consider a positive correlation with the key phrases 212 that are also relevant to the other documents having a same or similar position within the hierarchical topic map 208. Should the correlation coefficient 230 have a zero or negative value, exemplary embodiments may disregard the key phrases 212 as being generally irrelevant. Positive values thus help select a topic title key phrase 232 to assign to the electronic document 204.

Figure 5:
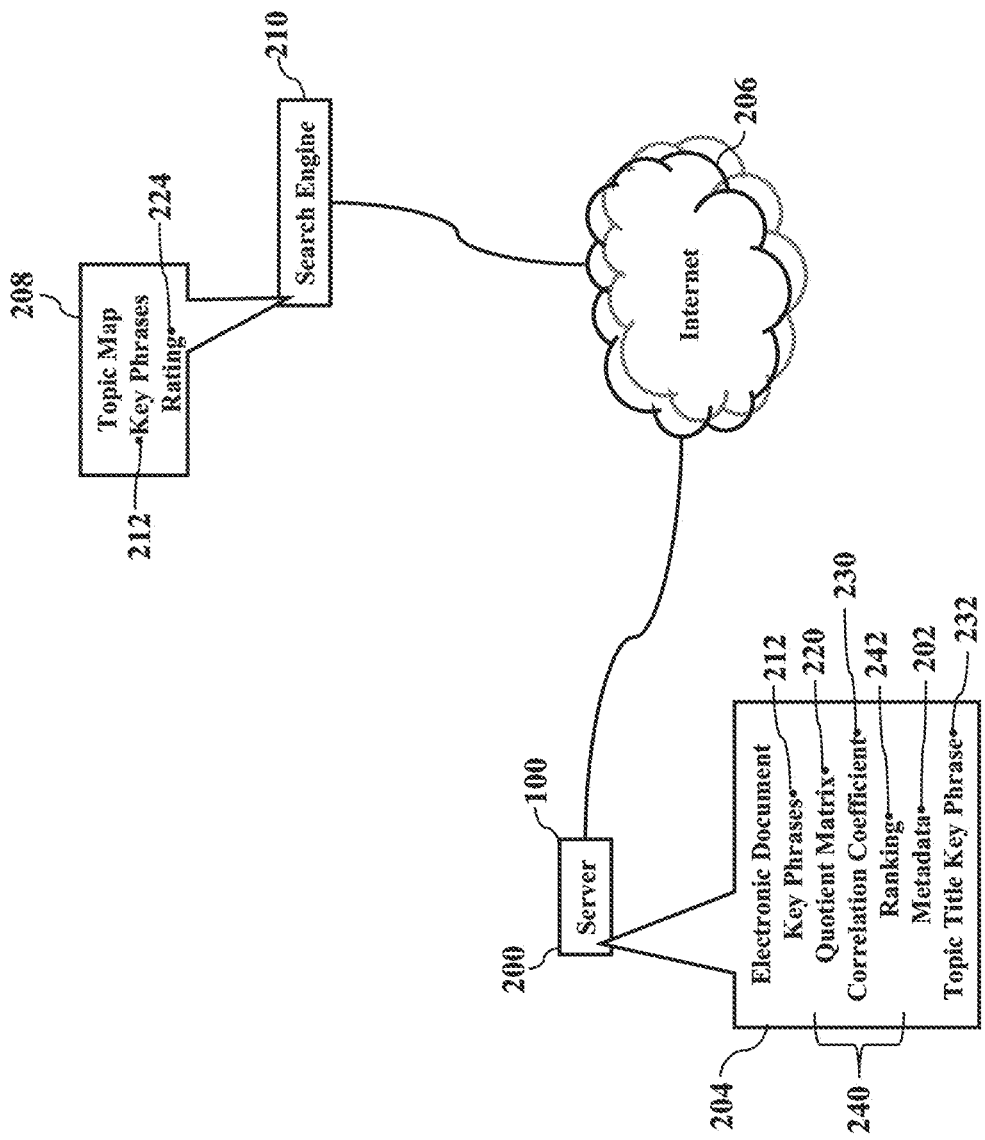

FIG. 5 illustrates corrective measures 240. Once the quotient matrices 220 and the correlation coefficients 220 are determined, exemplary embodiments may generate a ranking 242 of the key phrases 212. Each key phrase 212 is ranked based on its corresponding quotient matrix 220 and the correlation coefficient 230. The one or more highest ranking key phrases 212 perhaps best describe the topical content within the electronic document 204 and its overall position within the hierarchical topic map 208. The server 200 may then publish the electronic document 204 with the highest-ranking key phrases 212 added to the metadata 202 (such as a new or modified topic title key phrase 232). When the search engine 210 crawls the electronic document 204, the metadata 202 accurately determines its topical mapping. Exemplary embodiments have thus automatically generated the topic title key phrase 232 and/or the metadata 202 that is most relevant to the other documents having a same or similar position within the hierarchical topic map 208.

Figure 6:
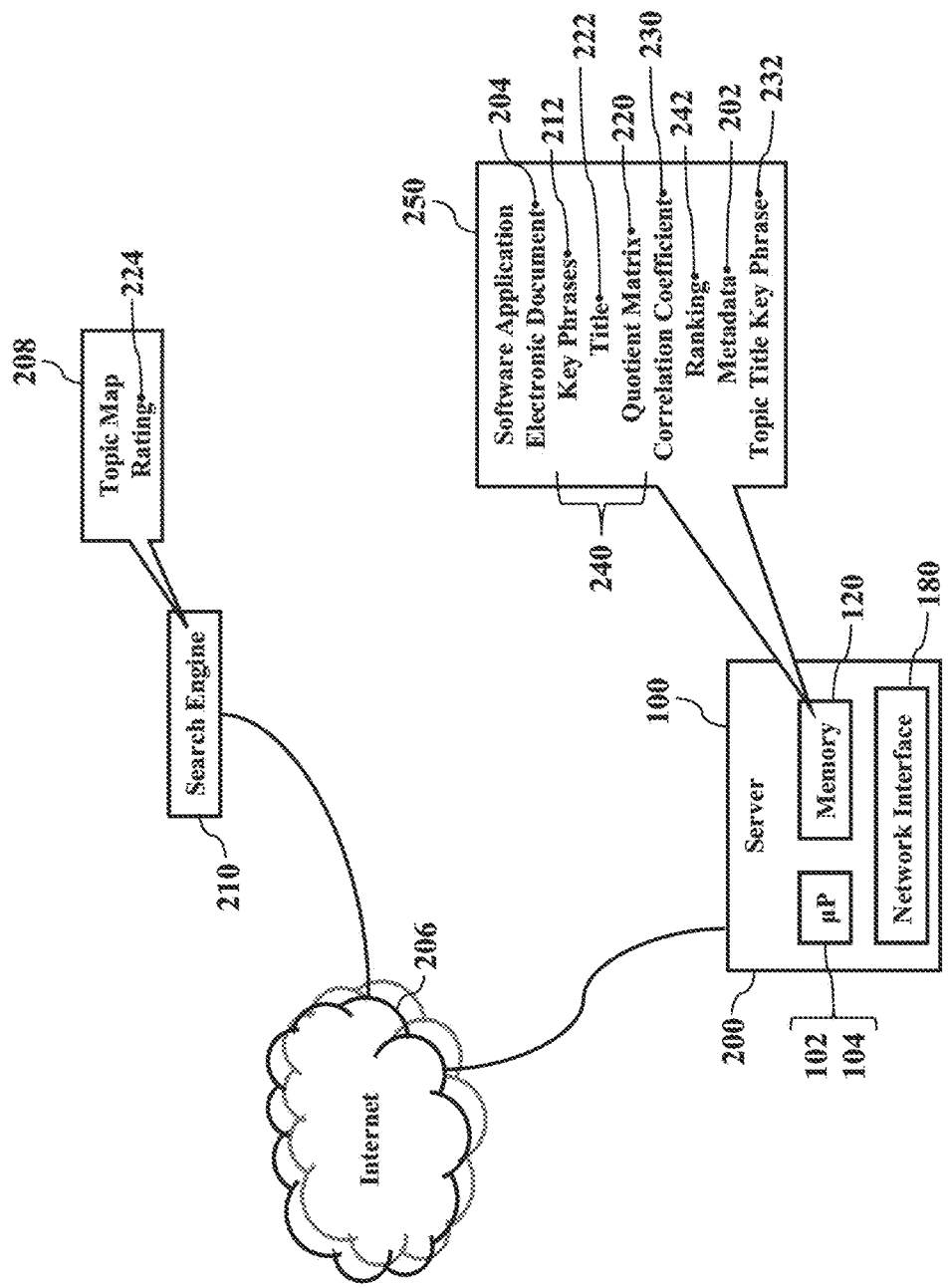
FIG. 6 is a block diagram further illustrating the operating environment, according to exemplary embodiments.

Exemplary embodiments thus present an elegant solution. Exemplary embodiments improve naming or titling of the electronic document 204 to improve searchability. Exemplary embodiments allow a uniform search strategy which provides results based on the key phrases 212 instead of conventional key words. The key phrases 212 are automatically defined, assigned, and stored for indexing FIG. 6 is a block diagram further illustrating the operating environment, according to exemplary embodiments. Here the information handling system ("IHS") 100 is again illustrated as the server 200. The server 200 has the processors 102 and/or 104 that execute a software application 250 stored in the memory device 120. The software application 250 includes code or instructions that cause the server 200 to retrieve electronic content representing the electronic document 204. The software application 250 instructs the processors 102 and/or 104 to generate the quotient matrix 220 based on the title 222 (perhaps after removing the generic textual words 214). The software application 250 may also instruct the processors 102 and/or 104 to generate the correlation coefficient 230 for each key phrase 212 in the title 222. The software application 250 may then instruct the server 200 to generate the ranking 242 based on the quotient matrix 220 and/or the quotient matrix 220. The software application 250 may then select the key phrases 212 having a highest ranking. The one or more highest ranking key phrases 212 perhaps best describe the electronic document 204 and its overall SEO rating 224. The server 200 may then publically publish the electronic document 204 via a communications network (such as the Internet 206), thus allowing the search engine 210 to classify or categorize the electronic document 204 (perhaps according to the metadata 202, such as the highest-ranking key phrases 212 and/or the topic title key phrase 232). When the search engine 210 crawls the electronic document 204, the metadata 202 accurately determines its topical mapping for search engine optimization.

Exemplary embodiments may packetize. The information handling system 100 may interface with the communications network (such as a local area network, a wide area network, and/or the Internet 206) via the network interface 180. Messages and data may be packetized into packets of data according to a packet protocol, such as the Internet Protocol. The packets of data contain bits or bytes of data describing the contents, or payload, of a message. A header of each packet of data may contain routing information identifying an origination address and/or a destination address. There are many different known packet protocols, and the Internet Protocol is widely used, so no detailed explanation is needed.

Exemplary embodiments may be applied regardless of networking environment. Exemplary embodiments may be easily adapted to stationary or mobile devices having cellular, Wi-Fi®, near field, and/or Bluetooth® capability. Exemplary embodiments may be applied to devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, the local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Figure 7:
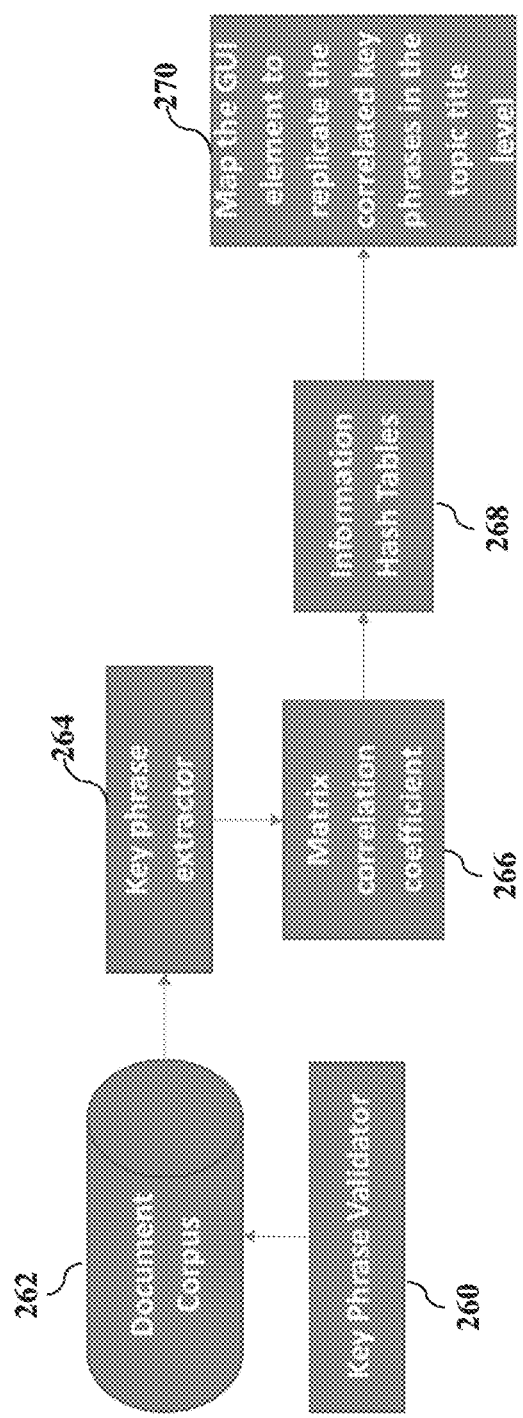
FIG. 7 is a block diagram illustrating a flowchart or method of validating and correlating content, according to exemplary embodiments.

FIG. 7 is a block diagram illustrating a flowchart or method of validating and correlating content, according to exemplary embodiments. A key phrase validator (Block 260) acts on a database of content (Block 262) to extract the key phrases 212 (Block 264). The quotient matrix 220 and the correlation coefficients 230 are determined in a matrix form for each key phrase 212 in the title 222 (Block 266). The quotient matrix 220 and the correlation coefficients 230 are hashed using a hashing algorithm to yield corresponding hash values (Block 268). The key phrases 212 may be chosen based on their respective hash values and mapped to elements in a graphical user interface (Block 270). Exemplary embodiments thus improve the searchability of product literature and other electronic content by improving the naming pattern. Exemplary embodiments thus provide a uniform search strategy which provides results based on the key phrases 212 instead of traditional key words.

Figure 8:
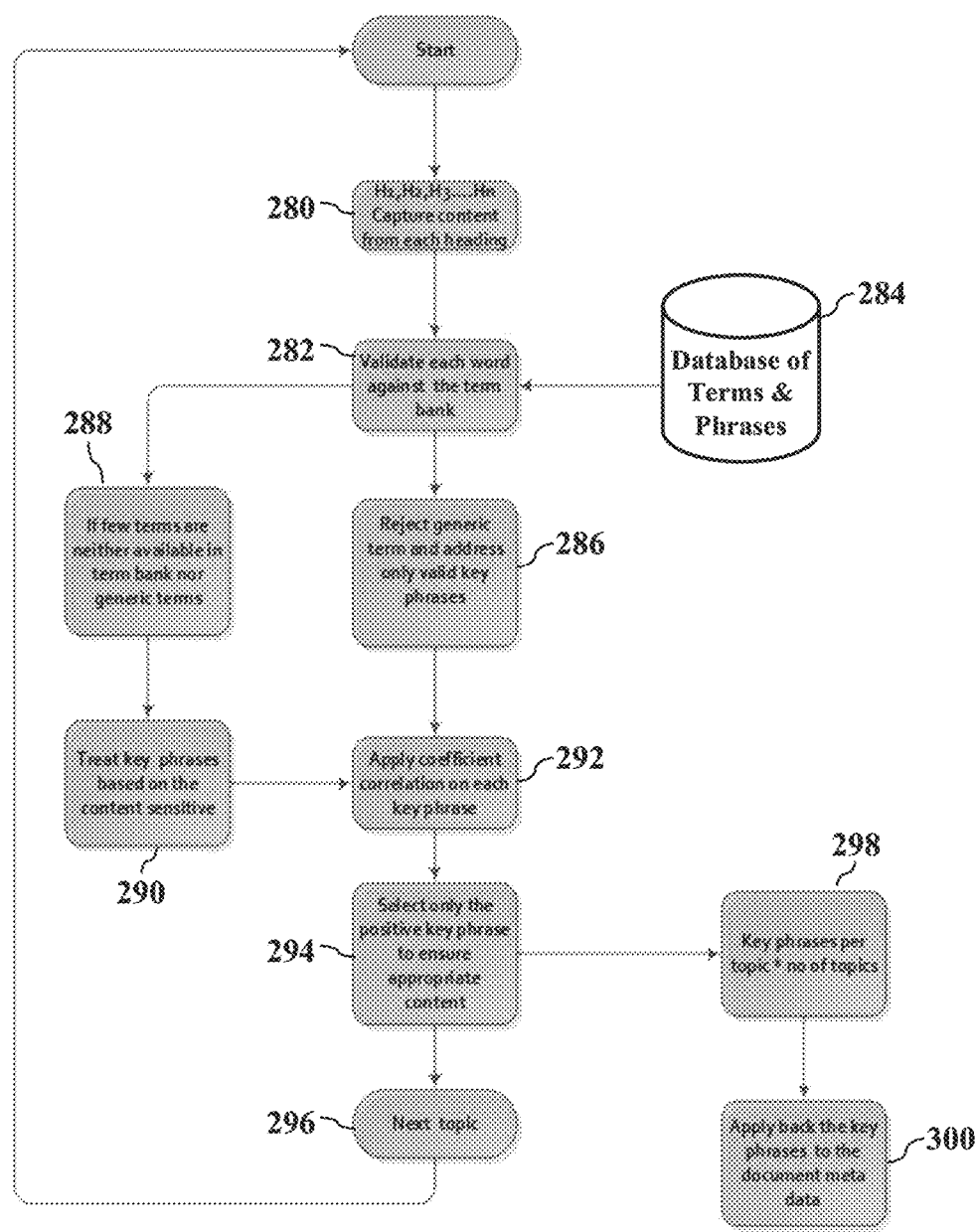
FIG. 8 is a more detailed block diagram illustrating a key phrase validator, according to exemplary embodiments.

FIG. 8 is a more detailed block diagram illustrating the key phrase validator 260, according to exemplary embodiments. As the reader may envision, the electronic document 204 (illustrated in FIGS. 2-7) may have multiple sections (such as chapters and/or sub-chapters). Each section may have the corresponding heading or title 222 (illustrated in FIGS. 3-5). The key phrase validator 260 may thus capture the electronic content associated with a heading (Block 280) and compare or validate (Block 282) to entries in a database 284 of terms and phrases. Any non-matching generic terms or words may be rejected (Block 286). Any non-matching phrases may be passed for processing (Blocks 288 and 290). The correlation coefficient 230 is determined for the key phrase 212 matched to the database 284 of terms and phrases (Block 292). The correlation coefficients 230 are determined and those greater than zero are selected (Block 294). If another header remains to be analyzed (Block 296), then the key phrase validator 260 returns to capture another header (Block 280) for processing. However, if all the headers have been analyzed (Block 296), then the total number of the key phrases 212 per topic may be multiplied by the number of topics (Block 298). The key phrases 212 are integrated into the metadata 202 (Block 300).

The search engine optimization is thus a matrix of values. The search engine optimization may be defined as $$m_{ki} = \begin{vmatrix} m_{k1} & m_{k2} \\ m_{i1} & m_{i2} \end{vmatrix}$$

$$m_{ki} = m_{k1}m_{i2} - m_{k2}m_{i1}$$

where k is the number of keywords or the key phrases 212 matching the words in the electronic document, m is the rating 224 of the search engine optimizer, and i is an integer number.

Figure 9:
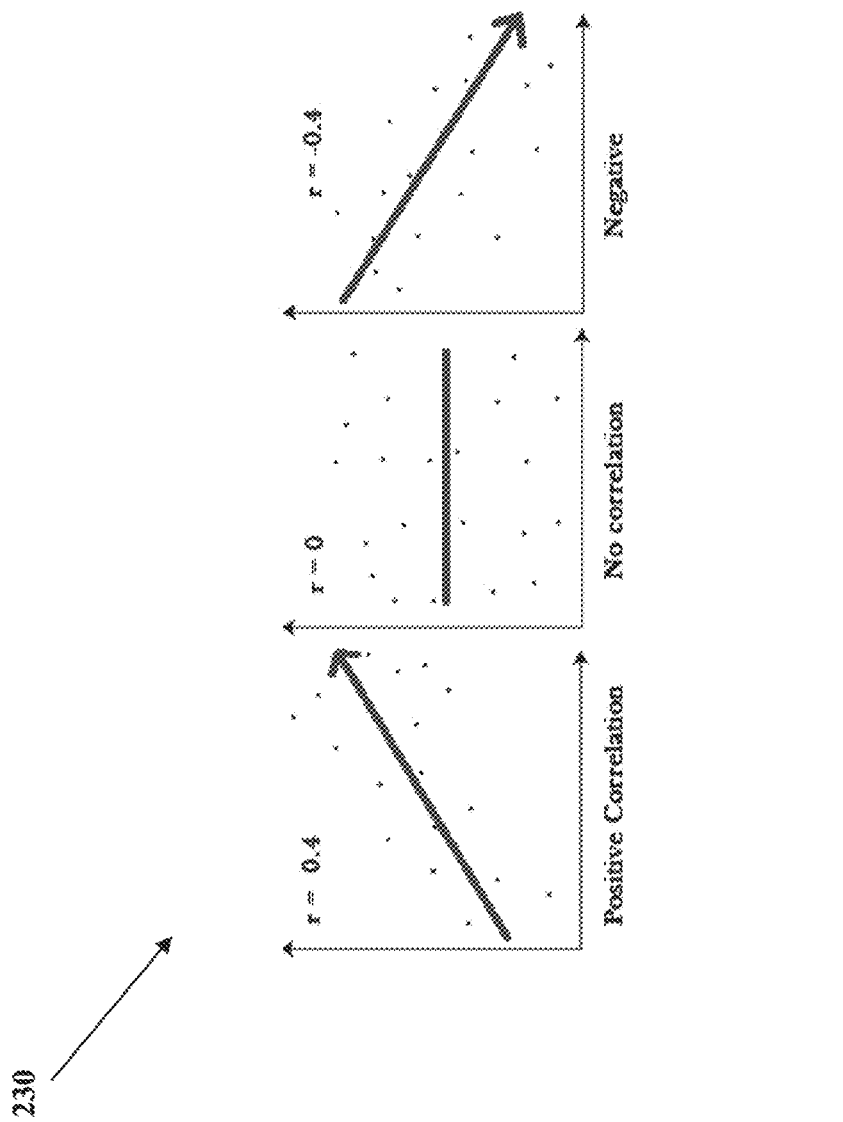
FIG. 9 illustrates a correlation coefficient, according to exemplary embodiments.

FIG. 9 illustrates the correlation coefficient 230, according to exemplary embodiments. The correlation coefficient 230 may be generated for each corresponding heading or title 222 (illustrated in FIGS. 3-5). The correlation coefficient (r) (illustrated as reference numeral 230 in FIGS. 4-7) may be defined as $$r = \frac{H'(xy)}{HxHy}$$

where H is data representing each different header title 222. The correlation coefficient 230 determines the appropriateness of the title key phrase from a product perspective. Individual titles may thus be validated with other topic titles from various other product documentation of the same product. Again, exemplary embodiments may only consider or accept those correlation coefficients 230 having a positive correlation with the relevant key phrases 212 which help in making right topic title key phrase 232 and eliminating irrelevant phrases. Again, the correlation coefficient 230 may be based on identifying the content C as the word set in the electronic document 204, yet perhaps discarding generic words from any of the key phrases 212 (perhaps if not part of a topic. The relevant key phrases 212 of the topic are determined based on correlation coefficient 230 of various topics across the electronic documents 204 associated with the same product (e.g., alphanumeric product identifier). The corresponding correlation coefficient 230 may be calculated using $$\sum_{i=0}^{n} Ki = \sum_{CiePi}^{n} \frac{H'(xy)}{HxHy}$$

where CiePi is the electronic content representing an individual topic multiplied by the number of topics and where H is data representing each different header title 222. Each $K_i$ is an individual key phrase 212.

The corrective measures 240 may be implemented. The quotient matrix 220 and the correlation coefficients 230 may be applied on the final deliverables based on the recommended key phrases 212 to optimize the SEO rating 224. The optimized SEO rating 224 may thus be defined as $$n_{kci} = \begin{vmatrix} n_{k1} & n_{k2} & n_{k3} \\ n_{c1} & n_{c2} & n_{c3} \\ n_{i1} & n_{i2} & n_{i3} \end{vmatrix} = n_{k1} \begin{vmatrix} n_{c2} & n_{c3} \\ n_{i2} & n_{i3} \end{vmatrix} - n_{k2} \begin{vmatrix} n_{c1} & n_{c3} \\ n_{i1} & n_{i3} \end{vmatrix} + n_{k3} \begin{vmatrix} n_{c1} & n_{c2} \\ n_{i1} & n_{i2} \end{vmatrix} =$$

$$n_{k1}(n_{c2}n_{c3} - n_{c3}n_{i2}) - n_{k2}(n_{c1}n_{i3} - n_{c3}n_{i1}) + n_{k3}(n_{c1}n_{i2} - n_{c2}n_{i1})$$

where n is the absolute quotient matrix 220 and $n_{kci}$ is [key phrase, content, implementation (1/0)]. The SEO rating 224 may thus be finalized as $$\Delta = n_{kci} - m_{ki}$$

Δ=Incremental SEO rating

Exemplary embodiments thus generate a quality rating based on the electronic content representing the electronic document 204. Exemplary embodiments may thus republish the electronic document 204 after adding the key phrases 212 to the topic title 212 and map with the corresponding product GUIs.

Figure 10:
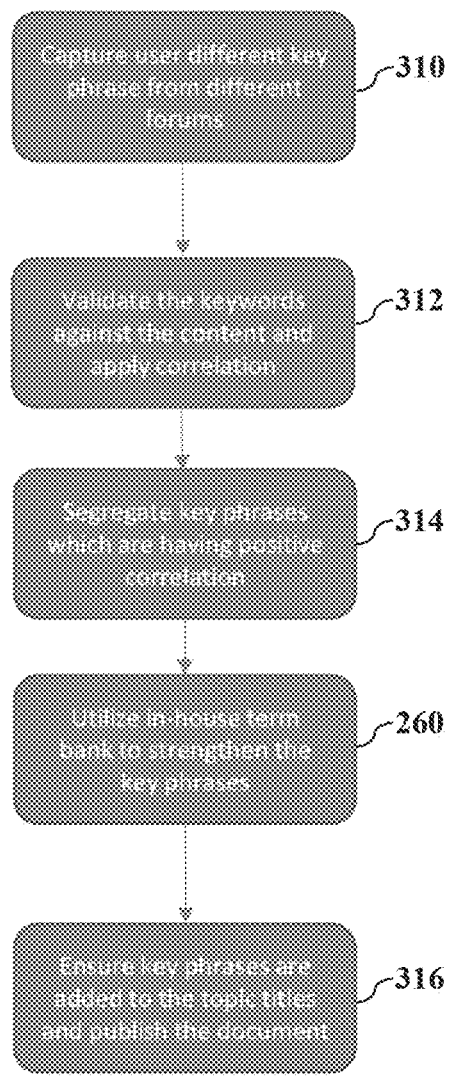
FIG. 10 illustrates a work flow, according to exemplary embodiments.

FIG. 10 illustrates a work flow, according to exemplary embodiments. The database 284 of terms and phrases is developed for a particular product. For example, exemplary embodiments may track and monitor search queries to a website (such as www.dell.com). The database 284 of terms and phrases may thus have entries reflecting popular query search terms (Block 310). The electronic document 204 (such as the titles 212) may thus be compared and validated to the database 284 of terms and phrases based on the quotient matrix 220 and the correlation coefficients 230 (Block 312). For example, suppose a user searches for documentation related to a baseboard management controller (or "BMC") (such as "I want to configure my server," "How do I use SCP for configuration," "How do I configure Raid Attributes," or "How does OS BMC configuration work?"). Exemplary embodiments may segregate the key phrases 212 having a positive correlation (Block 314) (such as a key phrase matrix including "configure my server" and "configuration"). The key phrase validator (Block 260) may be used to determine the key phrases 212 that best correlate for online help and other documents. The key phrases 212 may be added to the topic title key phrase 232 and publish documents (Block 316).

Exemplary embodiments may be applied to product searches. Exemplary embodiments thus optimize the subject matter of the electronic document 204 to the key phrases 214 utilized by similar product documentation. Indeed, exemplary embodiments may be applied to other interfaces like Redfish and WSMan. Currently, keyword searching is being implemented on 14G L3 for LC logs. However, exemplary embodiments present a more efficient solution that uses key phrase-based searching. Key phrase searching enables more intelligible searches based on correlation and hence help in natural language processing.

The proposed intelligence can be used in iDRAC product GUI search and other interfaces like Redfish and WSMan can benefit from it. Keyword search is being implemented in 14G L3 for LC logs. Our algorithm makes it more efficient to use key phrase-based search, make it more user centric. Key phrase search enables more intelligible searches based on correlation and hence help in natural language processing.

Exemplary embodiments may thus generate a list of the key phrases 212 for individual topics and for the entire electronic document 204. Exemplary embodiments identify the right key phrases 212 and ensure that the electronic document 204 is properly tagged for better search ability. Electronic content with the key phrases 212 are favorable for search engine optimization, as exemplary embodiments are agnostic and satisfy different search algorithms for multiple search engines. By automatically generating the key phrases 212, manual effort is reduced or eliminated and indexing and crawling becomes obvious to the search engine 210. Results and documentation may be standardized. Every user and content owner wants to read the correct and specific document which is readily available over different search engines. Exemplary embodiments thus not only reduce customer calls and costs, but revenue increases along with customer confidence and trust. Appropriate usage of the correct key phrases 212 will eventually help with improving NPS, NSS, and NPI scores.

Exemplary embodiments thus present a pre-press or publication solution. The key phrases 212 may be identified pre-press, based on the database 284 of terms and phrases and suggestions of the best fit based on search index while content creation/authoring/distribution. Exemplary embodiments may provide a pop-up for the topic title key phrases 232 that would best fit the electronic document 204. Every word of the electronic document 204 may be correlated with the title 222 and search indexes in advance. The titles 222 may be defined and integrated with any product glossary, as loaded in the database 284 of terms and phrases. Any author may thus tailor their electronic document 204 to the key phrases 212 electronically associated in the database 284 of terms and phrases. For existing content, based on the web-presence, the authors can be notified the steps to improve the content reach. A plug-in may be created that is integrated with the database 284 of terms and phrases, and the plug-in correlates electronic content with the topic title 212 and generates suggestions for improved search indexing.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to store information received via carrier wave signals such as a signal communicated over a transmission medium. Furthermore, a computer readable medium can store information received from distributed network resources such as from a cloud-based environment. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality.

The information handling system can include memory (volatile (e.g. random-access memory, etc.), nonvolatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device).

The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method for crawling an electronic document, comprising:
   receiving, by an information handling system, the electronic document;
   determining, by the information handling system, a positive correlation coefficient between the electronic document and key phrases associated with a product;
   generating, by the information handling system, a title associated with the electronic document in response to the positive correlation coefficient;
   determining, by the information handling system, a quotient matrix associated with the title, each quotient value in the quotient matrix defined as a quotient between different words in the title and a total count of the words in the electronic document;
   adding, by the information handling system, entries to an electronic database that electronically associate the title and the electronic document to the key phrases associated with the product; and
   providing, by the information handling system, the key phrases to a search engine when the crawling of the electronic document is performed.

2. The method of claim 1, further comprising determining a search engine optimization rating based on the words in the electronic document.

3. The method of claim 1, further comprising discarding a generic word from the title associated with the electronic document.

4. The method of claim 1, further comprising determining a search engine optimization rating based on the quotient matrix.

5. The method of claim 1, further comprising determining the quotient matrix for each word of the different words in the title.

6. The method of claim 1, further comprising discarding a negative correlation coefficient between the electronic document and the key phrases associated with the product.

7. The method of claim 1, further comprising discarding the key phrases in response to no correlation coefficient between the electronic document and the key phrases associated with the product.

8. An apparatus, comprising:
   a hardware processor; and
   a memory device accessible to the hardware processor, the memory device storing instructions, the instructions when executed causing the hardware processor to perform operations, the operations including:
   receiving an electronic document for crawling by a search engine;
   determining positive correlation coefficients between the electronic document and key phrases associated with a product;
   ranking the key phrases based on the positive correlation coefficients;
   selecting a highest ranking key phrase of the ranking of the key phrases;
   generating a title associated with the electronic document based on the highest ranking key phrase;
   determining a quotient matrix associated with the electronic document, each quotient value in the quotient matrix defined as a quotient between different words in the title and a total count of the words in the electronic document;
   adding entries to an electronic database that electronically associate the title and the electronic document to the key phrases associated with the product; and
   providing the key phrases to a search engine when the crawling of the electronic document is performed.

9. The system of claim 8, wherein the operations further comprise determining a search engine optimization rating based on the words in the electronic document.

10. The system of claim 8, wherein the operations further comprise discarding a generic word from the title associated with the electronic document.

11. The system of claim 8, wherein the operations further comprise determining a search engine optimization rating based on the quotient matrix.

12. The system of claim 8, wherein the operations further comprise determining the quotient matrix for each word of the different words in the title.

13. The system of claim 8, wherein the operations further comprise discarding a negative correlation coefficient between the electronic document and the key phrases associated with the product.

14. The system of claim 8, wherein the operations further comprise discarding the key phrases in response to no correlation between the electronic document and the key phrases associated with the product.

15. A memory device storing instructions that when executed cause a hardware processor to perform operations, the operations comprising:
   receiving an electronic document for crawling by a search engine;
   determining correlation coefficients between textual words in the electronic document and key phrases associated with a product;
   determining the key phrases associated with positive values of the correlation coefficients;
   determining quotient matrices for the key phrases associated with the positive values of the correlation coefficients, each quotient matrix in the quotient matrices defined as a quotient between words in the key phrases and a total number of the words in the electronic document;

hashing the quotient matrices for the key phrases using an electronic representation of a hashing algorithm to generate hash values;

determining a title for the electronic document, the title based on the hash values generated by the hashing of the quotient matrices for the key phrases associated with the positive values of the correlation coefficients;

associating the title in an electronic database to the electronic document; and providing the title as metadata for the crawling by the search engine.

16. The memory device of claim 15, wherein the operations further comprise determining a search engine optimization rating based on the quotient matrices.

17. The memory device of claim 15, wherein the operations further comprise discarding a generic word associated with the electronic document.

18. The memory device of claim 15, wherein the operations further comprise determining a greatest value of the quotient matrices.

19. The memory device of claim 15, wherein the operations further comprise discarding the key phrases associated with negative values of the correlation coefficients.

20. The memory device of claim 15, wherein the operations further comprise discarding the key phrases having no correlation.

* * * * *